(12) United States Patent
Naser et al.

(10) Patent No.: US 12,147,206 B2
(45) Date of Patent: Nov. 19, 2024

(54) METHOD AND APPARATUS FOR OPERATING AN AUTOMATED SYSTEM, AUTOMATED SYSTEM, AND COMPUTER-PROGRAM PRODUCT

(71) Applicant: OMRON Corporation, Kyoto (JP)

(72) Inventors: Mohammad Naser, 's-Hertogenbosch (NL); Martijn Elias, 's Hertogenbosch (NL)

(73) Assignee: OMRON CORPORATION, Kyoto (JP)

( * ) Notice: Subject to any disclaimer, the term of this patent is extended or adjusted under 35 U.S.C. 154(b) by 364 days.

(21) Appl. No.: 17/617,337

(22) PCT Filed: Jun. 29, 2020

(86) PCT No.: PCT/IB2020/056117
§ 371 (c)(1),
(2) Date: Dec. 8, 2021

(87) PCT Pub. No.: WO2020/261236
PCT Pub. Date: Dec. 30, 2020

(65) Prior Publication Data
US 2022/0253031 A1    Aug. 11, 2022

(30) Foreign Application Priority Data

Jun. 28, 2019  (EP) ..................................... 19183397

(51) Int. Cl.
*G05B 19/042*    (2006.01)

(52) U.S. Cl.
CPC .. *G05B 19/042* (2013.01); *G05B 2219/25255* (2013.01)

(58) Field of Classification Search
CPC ........ G05B 19/042; G05B 2219/25255; G05B 19/0426; G05B 2219/13174; G05B 2219/23326
See application file for complete search history.

(56) References Cited

U.S. PATENT DOCUMENTS 5,530,867 A    4/1996  Beran
6,145,115 A *  11/2000  Nishimura ........... G05B 19/045
                                                    716/117

(Continued)

FOREIGN PATENT DOCUMENTS

| JP | 2003034200 A | 2/2003 |
| JP | 2010204998 A | 9/2010 |
| WO | 2018206406 A1 | 11/2018 |

OTHER PUBLICATIONS

International Search Report for International Application No. PCT/IB2020/056117; Date of Mailing, Sep. 21, 2020.

(Continued)

*Primary Examiner* — Chad G Erdman
(74) *Attorney, Agent, or Firm* — CANTOR COLBURN LLP (57) ABSTRACT

A method for operating an automated system, the system comprising:
a controlled device for performing an action as a function of received control data;
a first control device for receiving system data and generating control data for controlling the controlled device as a function of the received system data; and
a second control device for receiving input data and generating output data as a function of the input data according to a computer-implemented mapping algorithm;
wherein the method comprises:
adapting the computer-implemented mapping algorithm such that the second control device, upon (Continued)

receiving the system data as input data generates output data that is similar to the control data generated by the first control device with a predetermined similarity degree, wherein the computer-implemented mapping algorithm includes a neural network algorithm and/or a machine learning algorithm.

12 Claims, 2 Drawing Sheets

(56) References Cited

U.S. PATENT DOCUMENTS

| | | |
|---|---|---|
| 2008/0091394 A1 | 4/2008 | Hahn et al. |
| 2012/0023054 A1 | 1/2012 | Piker |
| 2012/0101613 A1 | 4/2012 | Kapoor et al. |
| 2020/0031371 A1* | 1/2020 | Soliman ................ B60W 10/04 |
| 2020/0334554 A1* | 10/2020 | Takahashi ........... G06F 11/3065 |
| 2021/0142206 A1 | 5/2021 | Ghanea-Hercock |
| 2021/0318661 A1* | 10/2021 | Niu ...................... G05B 13/048 |

OTHER PUBLICATIONS

Written Opinion of International Searching Authority for International Application No. PCT/IB2020/056117; Date of Mailing, Sep. 21, 2020.
JPO Notice of Reasons for Refusal for corresponding JP Application No. 2021-569869; Mailing Date, Dec. 6, 2022.

* cited by examiner

METHOD AND APPARATUS FOR OPERATING AN AUTOMATED SYSTEM, AUTOMATED SYSTEM, AND COMPUTER-PROGRAM PRODUCT

CROSS REFERENCE TO RELATED APPLICATIONS

This is the U.S. national stage of application No. PCT/IB2020/056117, filed on Jun. 29, 2020. Priority under 35 U.S.C. § 119(a) and 35 U.S.C. § 365(b) is claimed from European Application No. 19183397.9, filed Jun. 28, 2019, the disclosure of which is also incorporated herein by reference.

TECHNICAL FIELD

The present disclosure relates to methods, apparatuses and computer-program products for operating automated systems, such as for operating factory automation systems, industrial networks, interacting field devices and the like. Further, automated systems and networks of interacting devices are disclosed. In particular, aspects of updating or replacing control devices in automation systems are considered.

Automation systems can comprise a controlled device for performing a task as a function of control data received from a control device of the automation system. It can be desirable to replace and/or update the control device. However, replacing and/or updating the control device can be difficult if the exact functionality of the control device is not known. It is thus desirable to facilitate the replacement and/or update of the control device.

BACKGROUND

U.S. Pat. No. 5,530,867 discloses a software for self-programming. The self-programming is based on parameters including input data, control data and the like. Further, US 2012/0023054 A1 discloses a method and device for creating a process model which is processable by a machine.

U.S. Pat. No. 6,145,115 A discloses a duplication of functions of a first device into a second device so as to have the same functions as the first device. A CPU supplies a predetermined input data to both the second device and the first device. A plurality of logic candidates for generating output data correspond to specific input data are stored in the hard disk as candidates. The CPU selects a candidate which makes both the output data generated by the second device and the first device identical with each other for all the supplied input data within the candidates.

SUMMARY

It is one object of the present invention to provide an improved method for operating an automated system. It is another object to provide an improved system for operating an automated system. A further object is to provide an improved machine controller device.

According to a first aspect, a method for operating an automated system is provided. The system comprises a first control device, a controlled device, and a second control device, wherein:
the controlled device is implemented to perform an action as a function of received control data;
the first control device is implemented to receive system data and to generate control data for controlling the controlled device as a function of the received system data; and
the second control device is implemented to receive input data and to generate output data as a function of the input data according to a computer-implemented mapping algorithm.

The method comprises:
adapting the computer-implemented mapping algorithm such that the second control device, upon receiving the system data as input data generates output data that is similar to the control data generated by the first control device with a predetermined similarity degree, wherein the computer-implemented mapping algorithm includes a neural network algorithm and/or a machine learning algorithm.

Based on the method of the first aspect, the computer-implemented mapping algorithm of the second control device can be adapted such that the output data generated by the second control device is similar to the control data generated by the first control data. In other words, the computer-implemented mapping algorithm of the second control device may be autonomously adapted such that the functionality of the second control device is similar to the functionality of the first control device. That way, the first control device may be replaced by the second control device despite not knowing the exact functionality of the first control device without programming hassle. Replacing the first control device by the second control device can also be advantageous for future improvement of the original first control device and/or in cases where the programming language of the first control device is not compatible with newer versions.

The automated system may be an automation system, in particular a factory automation system. It can comprise a plurality of devices such as field devices. One of the devices of the automated system is the controlled device, for example a field device or a robot. The controlled device can perform an action or a task based on control data received from the first control device. For example, the controlled device can mix chemicals in accordance with a recipe received as control data.

The first control device may be a central processing unit (CPU), a programmable logic controller (PLC) or the like. It may be a central control device of the automated system and/or a control device associated with the controlled device. The first control device can receive system data. The system data includes any type of data relating to the automated system. In particular, it includes data from an actuator and/or sensor of the automated system, configuration data, past data and/or present data. The system data is for example received from a cloud, a database, a server, a user or the like. The system data can be considered as a recipe for the first control device.

In particular, the first control device generates the control data as a function of the received system data thereby mapping the system data to control data according to an unknown control algorithm. In other words, the exact functionality of the first control device can be at least partly unknown to an operator of the automated system as the operator may not know the control algorithm based on which the first control device generates the control data from the received system data. The control algorithm may be at least partly unknown when the first control device was produced and/or programmed by an external manufacturer and/or when the first control device is old. In some embodiments, it might even be unknown which system data is used by the first control device to generate the control data. In other words, the nature and/or contents of the system data and/or the extent to which the system data is used by the first control device might be unknown.

Due to the at least partly unknown control algorithm of the first control device, replacing and/or updating the first control device can be difficult. In particular, replacing and/or updating the first control device can involve time-consuming manual reprogramming of the first control device.

In order to overcome these difficulties, a second control device can be used. The second control device may be an industrial PC device. The second control device can be used to perform the method step of adapting described above. In detail, the second control device can generate output data from input data using a computer-implemented mapping algorithm. The second control device can be considered as a replacement control device.

In particular, the computer-implemented mapping algorithm is modified in order to provide a similar functionality as the (unknown) control algorithm from the first control device. Namely, the computer-implemented mapping algorithm is adapted such that is generates output data that is similar to the control data generated by the first control device when it receives the input data. In other words, the first control device and the second control device can generate similar outputs when receiving similar inputs.

For complex control algorithms and large amounts of system data and control data, a neural network algorithm and/or a machine learning algorithm is preferred. In that case, the neural network algorithm and/or the machine learning algorithm can be used to determine the mapping algorithm. The input data and/or the output data of the second control device can be used as the training data. An example for a machine learning algorithm includes a reinforcement learning algorithm. The algorithm may be improved continuously upon reception of additional data relating to the automated system by the second control device. Alternatively or additionally, the mapping algorithm may include a table mapping a specific input value to a corresponding output value (mapping table) or a decision tree.

The term "adapting" here refers to the modification of the contents of the mapping algorithm. In particular, the algorithm itself (or a program defining the algorithm) is modified and/or developed in the adapting step. The adapting step in particular does not refer to a selection amongst different possible predefined algorithms.

Adapting can be the construction of a control strategy according to a relationship between the input data and the output data. The adapting can include the identification of the nature of the input data and/or its classification. For example, it can be distinguished between recipe data which determines the product made by the process of the automated system, control data which controls the machine making the product, feedback data which includes information provided from the machine to the control system and/or information signals which are used to analyze the process. The second control device for example stores the data from the different categories separately and analyzes them independently from one another to correspondingly adapt the mapping algorithm. Further, the second control device may identify relationships between the different data types and adapt the mapping algorithm accordingly.

In order to adapt the mapping algorithm, the second control device may include an agent which, based on the input data, performs an action to be tested. The action can be selected from a finite number of available actions, for example. The second control device monitors the result of the action performed on the input data by the agent and determines whether this result matches the operation of the first control device, in particular the control data, or at least goes into the same direction. These steps can be repeated to obtain a chain of actions, which can then be implemented in the mapping algorithm. If one result does not have the desired behavior, the second control device can go back to the last result with the expected behavior, for example.

In particular, the second control device monitors whether a change in the input and/or output data occurs and accordingly adapts the mapping algorithm. The second control device may further test the developed and/or adapted mapping algorithm, in particular to verify whether the constructed mapping algorithm is consistent with the operation of the first control device.

The input data received by the second control device may correspond to and/or include the system data provided to the first control device. For example, if the control device consistently receives five parameters as system data and sends seven parameters as control data, then the second control may monitor the repetition of this incident. At a high enough predetermined confidence level, i.e. when the incident has been repeated often enough, the second control device concludes that when five parameters are received, the output must be seven parameters, and adapt the mapping algorithm accordingly.

The input data does not have to be identical with the system data received by the first control device. Rather, the input data for the second control device may for example include all kinds of (present and past) data relating to the automated system, for example including data from sensors and/or actuators of the automated system and potentially data from the first control device.

The input data, the system data, the control data and/or the output data can include any type of data, in particular analog or digital inputs/outputs, database transaction, motor control data and the like.

The mapping algorithm can be adapted without knowledge of the system data and/or of the output data of the first control device to map the functionality of the first control device in an optimal manner. This is in particular advantageous, when little to no information is available on the system data and/or the output data of the first control device, for example, when the first control device is not working anymore. The second control device can be adapted to map the first control device even if the first control device is no longer working.

The mapping of the computer-implemented mapping algorithm to the control algorithm may be performed autonomously, for example using the second control device. That way, the second control device does not need to be programmed manually. The programming is thereby facilitated and becomes less time consuming. Further, a more reliable mapping can be achieved.

In particular, the word "similar" here means that the compared entities are similar with a predetermined similarity degree. The similarity degree can be seen as a measure for how similar the compared entities are, namely the extent to which the compared entities are identical or different. The predetermined similarity degree can for example indicate that the output data and the control data are similar if the difference between the values is always less than 5% of the control data. Alternatively, the output data and the control data may be considered as being similar if they are identical more than 95% of the time.

Once the desired similarity between output data and control data is obtained, the second control device may reliably replace the first control device. Facultatively, the second control device may then further be updated as compared to the first control device.

The second control device may be able to self-test the adapted mapping algorithm. In this regard, the second control device may perform a similarity check including verifying whether output data from the second control device matches the control data. If there is a mismatch, the second control device may gather more information (for example by receiving more input data) and modify the mapping algorithm based on the additional information and/or store the mismatch information for further monitoring. If the mismatch only occurs once, it can be marked as an error. If it occurs multiple times, the mapping algorithm can be modified.

According to an embodiment, the method further comprises:

monitoring the system data received by the first control device and the corresponding control data generated by the first control device.

The second control device can be used to perform the monitoring step. In particular, the method according to the first aspect comprises a monitoring step in which the system data and the corresponding control data are observed and/or collected, in particular received, by the second control device. The monitoring can also include receiving metadata on the system data and/or the control data. The computer-implemented mapping algorithm can be autonomously adapted or updated based on the collected system data and control data.

According to a further embodiment, the steps of monitoring and/or of adapting are repeatedly executed using a plurality of combinations of system data and generated control data.

In particular, the steps of monitoring and adapting are repeated until the desired similarity between output data and control data is obtained. The repeated execution of the steps of monitoring and adapting can be seen as a learning process in which the computer-implemented mapping algorithm is optimized in order to best map the control algorithm of the first control device.

According to a further embodiment, the steps of monitoring and adapting are executed during an operational phase of the automated system.

In particular, the steps of monitoring and adapting are performed using real system data and control data which are also used to operate the automated system. The computer-implemented mapping algorithm can be adapted dynamically, while the automated system is operating (operational phase). This is advantageous because the computer-implemented mapping algorithm can be developed without stopping the automated system and without interfering with the operation of the automated system. In detail, the automated system does not need to be interrupted when the first control device gets replaced.

According to a further embodiment, the step of adapting includes comparing the control data generated by the first control device and the output data generated by the second control device as a function of the same received system data for determining the similarity degree.

In particular, the similarity degree is determined by comparing the control data and the output data respectively determined by the first and second control devices based on the same system data. This comparison may be performed by the second control data itself or by an external comparison device of the automated system.

According to a further embodiment, the method according to the first aspect further comprises: if the similarity degree is larger than a predetermined upper threshold, replacing the first control device by the second control device, an optionally deactivating the first control device.

In particular, the desired similarity between output data and control data is obtained when the similarity degree is larger than a predetermined upper threshold. For example, the predetermined upper threshold can be a 99% similarity between control data and output data.

According to a further embodiment, the method may further comprise: if the similarity degree is smaller than a predetermined lower threshold, initiating the obtention of additional input data and/or storing the determined similarity degree in a database.

In particular, when the determined similarity is lower than the predetermined lower threshold (for example, lower than 80%), the second control device may determine that the mapping algorithm does not map the first control device well enough. In this case, it might request and/or initiate the obtention of additional input data, for example in order to modify the mapping algorithm based on the additional input data. Further, the second control device may store the determined similarity degree in a database for further reference. In some embodiments, if a given mismatch occurs only once, it can be marked as an error. If it occurs multiple times, the mapping algorithm can be modified.

The predetermined upper threshold and the predetermined lower threshold can be equal to each other. Further, in some embodiments, the similarity degree may distinguish only between the case where the output data matches the control data (100% similarity) and the case where the output data does not match the control data (0% similarity).

According to a further embodiment, determining the similarity degree includes statistically evaluating a coincidence of control data generated by the first control device and output data generated by the second control device if the same system data is received/input.

In particular, the results of the comparison between control data and output data are extrapolated in order to determine the similarity degree.

According to a further embodiment, the method according to the first aspect further comprises: replacing the first control device by the second control device, if the control data generated by the first control device and the output data generated by the second control device match for a predetermined number of, in particular consecutive, control cycles of the automated system.

According to a further embodiment, the controlled device comprises a field device, a production unit and/or a robot.

According to a further embodiment, the system data are sensor data acquired by sensor devices in the automated system.

The sensor devices can sense parameters such as temperature, pressure, velocity or the like and generate system data accordingly. The sensor devices can be located next to the controlled device in order to sense parameters of the controlled device. In this case, the first control device provides control data based on sensor data of the controlled device.

According to a further embodiment,
the automated system further comprises a database device for providing configuration data for the first control device; and the first control device is further implemented to receive configuration data and to generate the control data as a function of the received system data and the configuration data;

adapting the second control device includes inputting the system data and the configuration data as input data to the second control device.

The first control device may generate the control data based on both the system data and the configuration data. Accordingly, the computer-implemented mapping algorithm is adapted based on the system data and the configuration data (together forming the input data) and on the control data generated by the first control device.

According to a further embodiment, the system data, the configuration data and/or the control data are each represented by a plurality of analog and/or digital signals.

According to a second aspect, a machine controller device is provided. The machine controller device is implemented to:

receive input data and generate output data as a function of the input data according to a computer-implemented mapping algorithm; and adapt the computer-implemented mapping algorithm such that the machine controller device, upon receiving the system data as input data generates output data that is similar to the control data generated by the first control device with a predetermined similarity degree, wherein the computer-implemented mapping algorithm includes a neural network algorithm and/or a machine learning algorithm.

The machine controller device may correspond to the previously described second control device. In particular, the machine controller device according to the second aspect is configured to be used as the second control device in the method according to the first aspect or according to any embodiment of the first aspect.

The features described with reference to the second control device equally apply to the machine controller device according to the second aspect.

According to a third aspect, an operating system for operating an automated system is provided. The automated system comprises:

a controlled device implemented to perform an action as a function of received control data; and a first control device implemented to receive system data and to generate control data for controlling the controlled device as a function of the received system data.

The operating system further comprises the machine controller device according to the second aspect, wherein the computer-implemented mapping algorithm includes a neural network algorithm and/or a machine learning algorithm.

In particular, the operating system further comprises: a second control device implemented to receive input data and to generate output data as a function of the input data according to a computer-implemented mapping algorithm;

a monitoring device for monitoring the system data received by the first control device and the corresponding control data generated by the first control device; and an adaptation device for adapting the computer-implemented mapping algorithm such that the second control device, upon receiving the system data as input data generates output data that is similar to the control data generated by the first control device with a predetermined similarity degree.

The monitoring device and/or the adaptation device can be part of the second control device. The operating system according to the third aspect may be used to implement the method according to the first aspect or according to an embodiment thereof.

The embodiments and features described with reference to the method according to the first aspect apply mutatis mutandis to the system according to the third aspect.

According to a fourth aspect, a computer program product is provided. The computer program product includes computer-readable instructions causing a computing system including one or more processing devices, in response to executing the machine-readable instructions, to execute the method according to the first aspect or according to an embodiment thereof, in particular to perform the above-described methods and functions for operating an automated system.

In embodiments, computer-program product comprises a program code for executing the above-described methods and functions by a computerized control device when run on at least one control computer. A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF DRAWINGS

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

Figure 1:
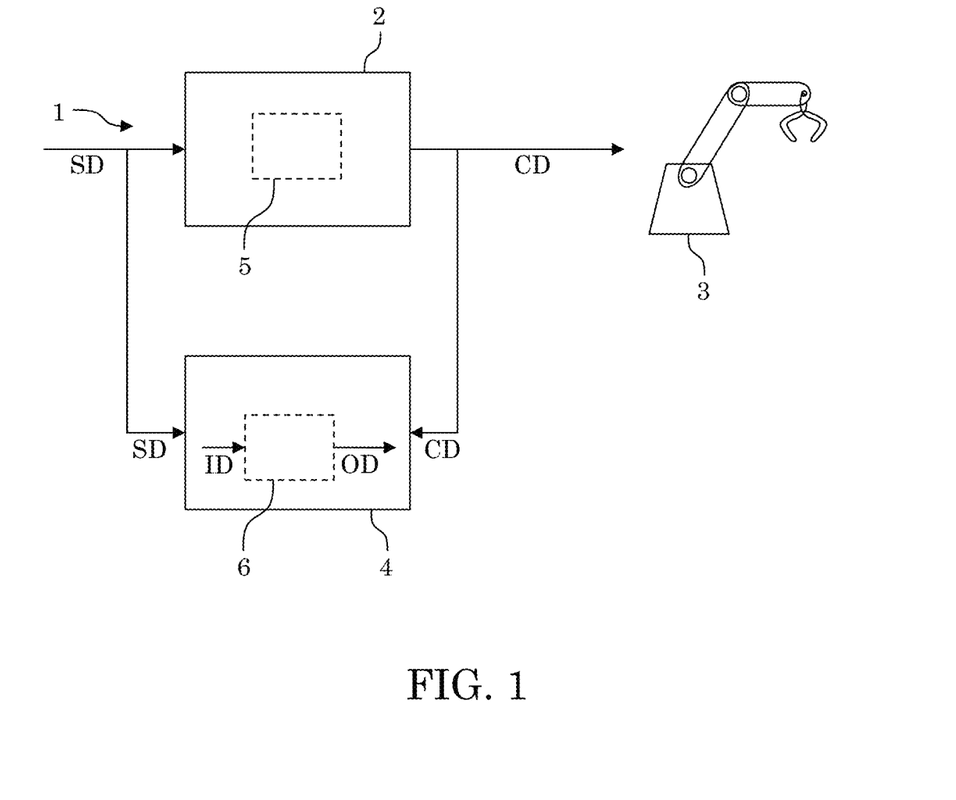
FIG. 1 shows an embodiment of an automated system.

FIG. 1 shows an embodiment of an automated system 1. The automated system 1 is a factory automation system. It comprises a first control device 2, a controlled device 3 and a second control device 4. The automated system 1 further comprises a plurality of field devices which are not shown in FIG. 1.

The controlled device 3 is a robot arm. It is controlled by the first control device 2. In detail, the first control device 2 receives system data SD from a server (not shown). The system data SD are here instructions about how to screw a cap onto a bottle.

The first control device 2 is a PLC which generates control data CD based on the system data SD, for example using a control algorithm 5. The control data CD are an adaptation of the system data SD to the controlled device 3. In other words, the control data CD comprise instructions for the controlled device 3 about the actions to perform in order to actually screw the cap ono the bottle. The controlled device 3 performs the actions as a function of the control data CD received from the first control device 2.

In the example of FIG. 1, the first control device 2 is rather old and need to be updated. However, it was originally programmed by an external manufacturer and the user of the automated system 1 does not know the details about how the first control device 2, in particular the control algorithm 5 works.

In order to update the old first control device 2, the first control device 2 can be replaced by the second control device 4, which can then be updated at wish. In order to replace the first control device 2 by the second control device 4, the second control device 4 has to be able to reliably perform the functions of the first control device 2 in a similar manner.

The second control device 4 is removeable connected to the input and output of the first control device 2 and is thereby capable of monitoring the system data SD and the corresponding control data CD generated by the first control device 2. The second control device 4 is here an industrial PC (IPC). The second control device 4 comprises a computer-implemented mapping algorithm 6 which generates output data OD from input data ID. As an example, the input data ID here includes the system data SD and further includes additional data on the automated system 1, for example data received from sensors and/or actuators of the automated system 1. The computer-implemented mapping algorithm 6 will be further described below.

Figure 2:
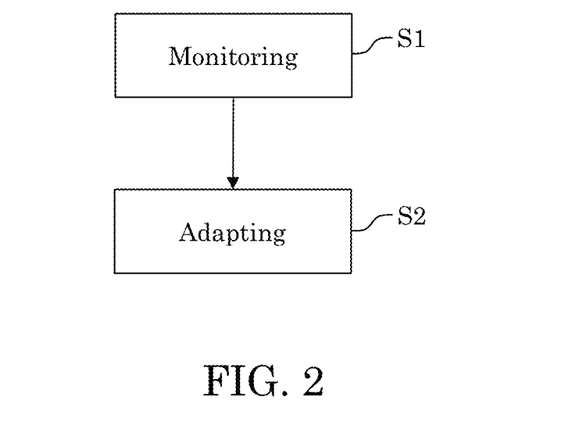
FIG. 2 shows a method for operating an automated system according to a first embodiment.

The automated system 1 of FIG. 1 can be operated according to a method for operating an automated system. An example of such a method is shown in FIG. 2. In detail, FIG. 2 shows a method for operating an automated system 1.

In a facultative step S1, the system data SD received by the first control device 2 and the corresponding control data CD generated by the first control device 2 are monitored. This monitoring is here performed by the IPC 4. The monitoring consists in collecting large amounts of system data SD and of corresponding control data CD. The monitoring occurs while the automated system 1, and in particular the first control device 2 and controlled device 3 are in operation. The monitored data SD, CD is thus "real" operation data.

In step S1, the IPC 2 stores data tables comprising the monitored system data SD and the corresponding control data CD. An example of such a monitoring table is shown in Table 1. In Table 1, the system data SD comprises three input parameters IN1, IN2 and IN3 and the control data CD comprises three output parameters OUT1, OUT2 and OUT3 generated by the first control device 2 as control data CD for the inputs (system data SD) IN1, IN2 and IN3.

TABLE 1

| IN1 | IN2 | IN3 | OUT1 | OUT2 | OUT3 |
|---|---|---|---|---|---|
| 1 | 3 | 2 | 5 | 1 | 2 |

In a step S2, the computer-implemented mapping algorithm 6 of the IPC 4 is adapted such that upon receiving the system data SD as input data ID, the IPC 4 generates output data OD that is similar to the control data CD generated by the first control device 2 with a predetermined similarity degree. In the example of FIG. 1 and FIG. 2, step S2 is performed by the IPC 4.

Step S2 corresponds to a learning step in which the computer-implemented mapping algorithm 6 gets mapped to the control algorithm 5. In detail, the final contents of the two algorithms 5, 6 and the used programming languages are not necessarily the same. However, based on a same input (system data SD as input data ID), they should generate a similar output (control data CD, output data OD).

The computer-implemented mapping algorithm 6 is here a machine-learning algorithm. The computer-implemented mapping algorithm 6 learns from the stored monitoring tables and autonomously adapts or updates itself accordingly. The computer-implemented mapping algorithm 6 is adapted according to the relationship between system data SD and the control data CD.

For example, the adaptation of the computer-implemented mapping algorithm 6 bases itself on the detection of which input value IN1-IN3 correlates with which output value OUT1-OUT3 and vice versa.

For example, the value IN2 correlates with OUT2 and OUT3 because a modification of IN2 modifies OUT2 and OUT3, as shown in the below monitoring table (Table 2).

TABLE 2

| IN1 | IN2 | IN3 | OUT1 | OUT2 | OUT3 |
|---|---|---|---|---|---|
| 1 | 7 | 2 | 5 | 0 | 5 |

Figure 4:
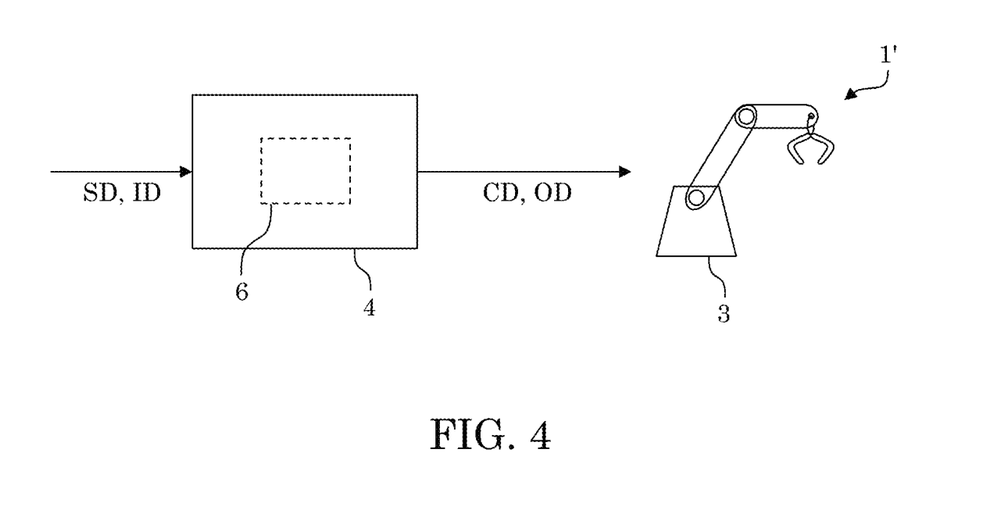
FIG. 4 shows an automated system with a replaced control device.

The predetermined similarity degree is here achieved when the output data OD and the control data CD are equal 95% of the time. When the desired similarity degree is achieved, the IPC 4 can replace the first control device 2 and take over its functionalities, as shown in FIG. 4. In detail, the IPC 4 then receives the system data SD as input data ID and generates the control data CD as the output data OD using the trained computer-implemented mapping algorithm 6. The control data CD generated by the IPC 4 is then sent to the robot 3.

The old first control device 2 can thus be replaced by a newer and understandable control device 4 which can be more easily updated as it can be understood.

Figure 3:
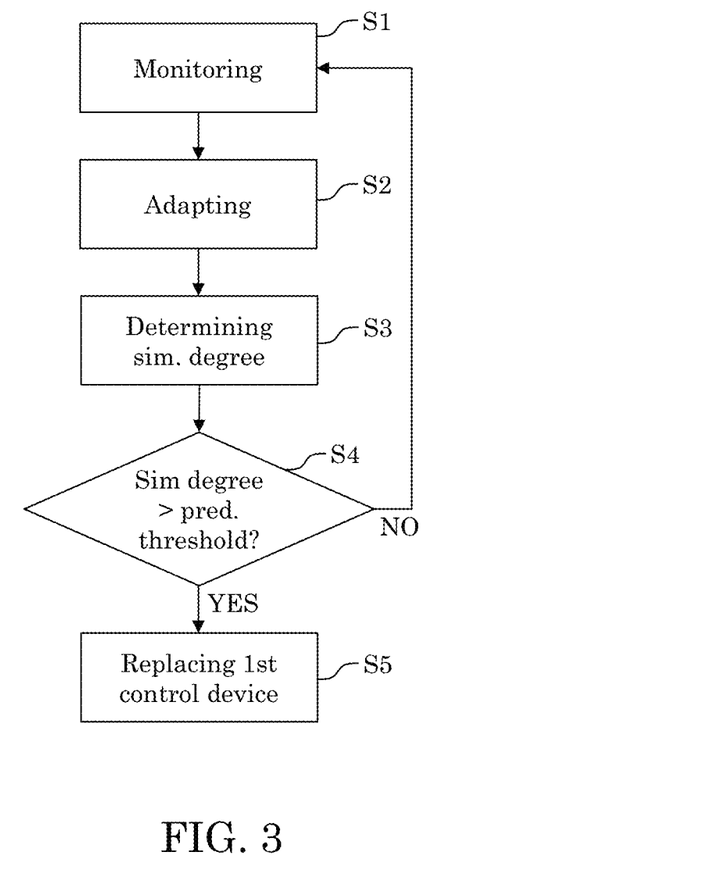
FIG. 3 shows a method for operating an automated system according to a second embodiment.

FIG. 3 shows a further method for operating the automated system 1 of FIG. 1. Beyond the already described steps S1 and S2, the method shown in FIG. 3 further comprises the steps S3-S5. The steps S3-S5 allow a testing of the computer-implemented mapping algorithm 6. This testing might be performed by the second control device 4.

In a step S3, the similarity degree between the output data OD and the control data CD respectively generated by the IPC 4 and the first control device 2 for the same system data SD as an input is determined. The determination of the similarity degree involves comparing the control data CD generated by the first control device 2 and the output data OD generated by the IPC 4 as a function of the same system data SD. The comparison in step S3 is here performed by the IPC 4 itself.

In a step S4, the similarity degree determined in step S3 is compared to a predetermined threshold, which is pre-stored by the IPC 4 or provided by a user. As an example, the predetermined threshold here requires a similarity of 99%.

If the similarity degree is greater than the predetermined threshold ("YES" in step S4), the computer-implemented mapping algorithm 6 of the IPC 4 is validated and the first control device 2 is replaced by the IPC 4. The first control device 2 is removed without stopping the operation of the automated system 1 because the already connected IPC 4 allows for a smooth transition of the control functionalities. As a result of step S5, the automation system 1' of FIG. 4 with a replaced control device 2 is obtained.

If the similarity degree is not greater than the predetermined threshold ("NO" in step S4), the previously described steps S2-S4 are repeated until the similarity degree becomes greater than the predetermined threshold ("YES" in step S4) or until an error is noticed.

Although the present invention has been described in accordance with preferred embodiments, it is obvious for the person skilled in the art that modifications are possible in all embodiments. For example, the first control device 2 may also receive configuration data based on which it determines the control data CD. In this case, the system data SD and the configuration data are used as the input data in the adapting step S2.

Further, the controlled device 3 can also be a field device or the like. The computer-implemented mapping algorithm 6 can also comprise a mapping table or a decision tree instead of a machine-learning algorithm. Other testing methods than that described in view of FIG. 3 are also possible, for example observing whether the control data CD and the output data OD match for a predetermined number of consecutive cycles of the automated system 1. It is also possible to vary the number of inputs IN1-IN3 and of outputs OUT1-OUT3.

Although in the described example, the system data SD is known to the second control device 4, it is also possible to adapt the mapping algorithm 6 without any knowledge of the system data SD input into the first control device 2. For example, the input data ID of the second control device 4 can include any past/present data relating to the automated system 1.

REFERENCE NUMERALS

1 automated system
1' automated system
2 first control device
3 controlled device
4 second control device
5 control algorithm
6 computer-implemented mapping algorithm
CD control data
ID input data
OD output data
SD system data
S1-S5 method steps

The invention claimed is:

1. A method for operating an automated system, the system comprising a first control device, a controlled device and a second control device, wherein:
 the controlled device is implemented to perform an action as a function of received control data;
 the first control device is implemented to receive system data and to generate control data for controlling the controlled device as a function of the received system data; and
  the second control device is implemented to receive input data and to generate output data as a function of the input data according to a computer-implemented mapping algorithm;
  wherein the method comprises:
   adapting the computer-implemented mapping algorithm such that the second control device, upon receiving the system data as input data generates output data that is similar to the control data generated by the first control device with a predetermined similarity degree, wherein the computer-implemented mapping algorithm includes a neural network algorithm and/or a machine learning algorithm,
  wherein the adapting includes comparing the control data generated by the first control device and the output data generated by the second control device as a function of the same received system data for determining the similarity degree,
  if the similarity degree is larger than a predetermined upper threshold, replacing the first control device by the second control device, and optionally deactivating the first control device; and/or
  if the similarity degree is smaller than a predetermined lower threshold, initiating the obtention of additional input data and/or storing the determined similarity degree in a database.

2. The method according to claim 1, further comprising: monitoring the system data received by the first control device and/or the corresponding control data generated by the first control device.

3. The method according to claim 2, wherein the monitoring or the adapting are repeatedly executed using a plurality of combinations of system data and generated control data.

4. The method according to claim 2, wherein the monitoring and the adapting are executed during an operational phase of the automated system.

5. The method according to claim 1, wherein determining the similarity degree includes statistically evaluating a coincidence of control data generated by the first control device and output data generated by the second control device if the same system data is received/input.

6. The method according to claim 1, further comprising: replacing the first control device by the second control device, if the control data generated by the first control device and the output data generated by the second control device match for a predetermined number of, in particular consecutive, control cycles of the automated system.

7. The method according to claim 1, wherein the controlled device comprises a field device, a production unit and/or a robot.

8. The method according to claim 1, wherein the system data are sensor data acquired by sensor devices in the automated system.

9. The method according to claim 1, wherein:
 the automated system further comprises a database device for providing configuration data for the first control device; and
 the first control device is further implemented to receive configuration data and to generate the control data as a function of the received system data and the configuration data;
 adapting the second control device includes inputting the system data and the configuration data as input data to the second control device.

10. The method according to claim 1, wherein the system data, the configuration data and/or the control data are each represented by a plurality of analog and/or digital signals.

11. A machine controller device implemented to:
 receive input data and generate output data as a function of the input data according to a computer-implemented mapping algorithm; and
 adapt the computer-implemented mapping algorithm such that the machine controller device, upon receiving the system data as input data generates output data that is similar to the control data generated by the first control device with a predetermined similarity degree, wherein the computer-implemented mapping algorithm includes a neural network algorithm and/or a machine learning algorithm, wherein the machine controller device is configured to compare the control data generated by the first control device and the output data generated by the second control device as a function of the same received system data for determining the similarity degree, if the similarity degree is larger than a predetermined upper threshold, the machine controller device replaces the first control device by the second control device, and optionally deactivates the first control device; and/or if the similarity degree is smaller than a predetermined lower threshold, the machine controller device initiates the obtention of additional input data and/or stores the determined similarity degree in a database.

12. An operating system for operating an automated system, wherein the automated system comprises:
   a controlled device implemented to perform an action as a function of received control data; and
   a first control device implemented to receive system data and to generate control data for controlling the controlled device as a function of the received system data;
   wherein the operating system comprises a machine controller device according to claim 11.

\* \* \* \* \*